United States Patent Office 2,927,745
Patented Mar. 8, 1960

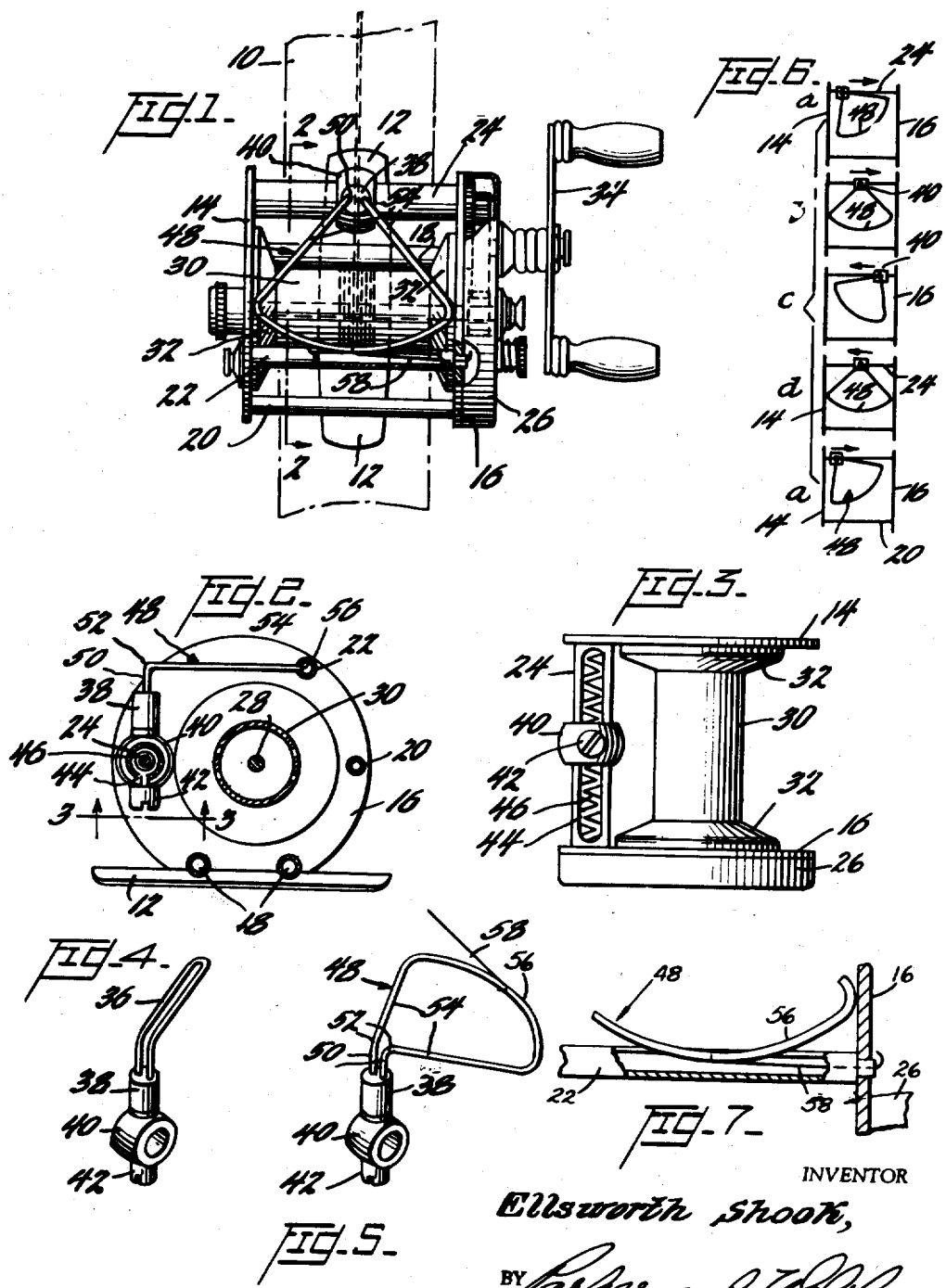

2,927,745
LEVEL WINDING FISHING REEL

Ellsworth Shook, Sioux City, Iowa, assignor of fifty percent to Stanley M. Corbett, Sioux City, Iowa Application December 23, 1955, Serial No. 555,015

5 Claims. (Cl. 242—84.42)

This invention relates to level winding fishing reels.

In the conventional level winding fishing reel a winding guide is arranged on the pole side of the reel, to oscillate back and forth across the face of the spool to control the laying on of the line. Such guide usually consists of means forming a comparatively narrow slit, such as a loop of wire, the arms of the loop acting to move the line from side to side of the spool, thereby distributing it evenly upon the spool.

A line being cast from a reel having a conventional guide must be precisely in line with the line guide at the time of casting, in order to avoid fouling.

When the line runs through the conventional guide at a speed sufficient to throw a lure weighing ½ to ⅝ of an ounce, it must have considerable force behind it, therefore the line vibrates from side to side striking the sides of the guide, slowing it at that point, with the result that the line coming off the spool loops over the slack line, which accumulates behind the conventional guide loop causing a tangle in the line known as a back lash or bird's nest. But with my invention, by allowing a large area for the line to come off the reel, it eliminates back lashes and bird's nests.

Using the type of device which I have invented, the line does not have to be wound precisely, since there is nothing for it to catch on when coming off the spool. In other words, the line is free, with nothing to cause bird's nests. Heavier lines may be used with success with the new type of device, where they cannot be used with a conventional device due to the fact that with the new device, there is greater freedom, in that line leaves the reel without impinging on the surface of the guide but when being rewound, it returns in substantially the same manner as through a conventional guide and is wound on the spool in a regular manner for the next cast.

My invention can best be understood by reference to the accompanying drawing, wherein:

Figure 1 is a plan view, partly in section, of a fishing reel equipped with my new type of guide;

Figure 2 is a vertical section along the line 2—2 of Figure 1;

Figure 3 is a bottom plan view taken along the line 3—3 of Figure 2, with certain parts omitted for the sake of clarity;

Figure 4 is a perspective view of a conventional guide, mounted on the winding carriage;

Figure 5 is a similar view of my improved guide;

Figure 6 consists of a series of schematic plan views showing the progress of the winding operation; and Figure 7 is an enlarged view of the lower right portion of Figure 1.

Referring now to the drawing, the numeral 10 refers to the fishing pole butt upon which rests the mounting plate 12 of the reel. The reel itself is made up of a tail plate 14 and head ring 16 connected by cage bars 18, 20, 22 and carriage screw housing 24.

Passing through the reel from tail plate 14 to head cap 26 is cross bolt 28 upon the axis of which the spool, made up of barrel 30 and ends 32 rotate. By turning handle 34, the spool rotates through gears, only partly shown in the housing between the head ring 16 and the head cap 26.

The conventional guide mechanism includes a loop 36 of wire with the ends thereof embedded in cap 38 mounted on carriage 40. A follower screw 42 projects through slot 44 in the underside of the carriage screw housing 24 to engage the cross threads of carriage screw 46. By means of an appropriate gear on the end of carriage screw 46, within the head cap 26, the carriage screw is rotated. As it rotates, the carriage 40 oscillates between tail plate 14 and head ring 16 to evenly distribute the laying on of the line into the spool. As normally constructed, the cap 38 is fixed to the carriage 40.

I replace the fixed cap 38 with a cap similar in all respects save that it is freely rotatable upon the carriage 40. Mounted upon this cap 38 is a new guide loop 48 as shown in Figure 5. The loop 48 may be advantageously formed of a loop of wire of suitable guage. The two ends of the loop are suitably embedded in the cap 38 and rise forming uprights 50, arranged in parallel relationship to form a short vertical slot of about the same width as is customary in the usual line guides. At a point 52, slightly above the horizontal line passing through the hub ends 32 of the spool, the loop members are bent in a horizontal direction and are caused to diverge outwardly into two arms 54. The angle formed between the arms 54 may be chosen in the range from about 60 to 90 degrees. The arms 54 are connected by an arcuate portion 56 to complete the loop 48.

The arcuate portion 56 of the loop 48 is supported and guided by a channel formed in cage member 22. As an aid to holding the arcuate portion 56 in the channel of member 22, a fine hair spring 58 is passed through a fine hole in the center of the arcuate portion and bent over at its inner end. The outer end is passed through the hollow mounting of the member 22 in plate 16 and secured there.

As shown schematically in Figure 6, when my new guide loop 48 makes a traverse of the carriage screw 46, the arcuate portion 56 rocks back and forth upon cage member 22 with the carriage cap 38 oscillating about its vertical axis. The spring 58 serves to stabilize the movement of the arcuate portion 56.

It will be seen that, in normal operation the two vertical members 50 serve to guide the line passing between them in the same manner that conventional guides do. However, the comparatively large area embraced by the two arms 54 and the arcuate portion 56, is sufficient to permit the passing of any tangled portion of line therethrough. The presence of this enlarged loop greatly facilitates access to tangled lines and permits them to be lifted out and disengaged from the winding mechanism whereby it may then be worked upon at the fisherman's leisure.

The guide is especially advantageous in that it can be built into existing types of reels with a minimum amount of modification. My new winding guide has proved exceptionally convenient in a wide variety of fishing conditions.

I claim:

1. In a fishing reel of the level winding type, a winding guide including a pair of substantially parallel upright members defining a narrow line guide slot, open at the top and extending vertically across the path of line travel, said members being bent backwardly toward the reel at the upper, open end of the slot, and diverging from the point of bending, said members being united by an arcuate portion connecting the remote ends of said diverging portions of said members, thereby forming a wide loop having approximately the shape of a segment of a circle with the apex at the point of bending.

2. In a fishing reel of the level winding type, an improved winding guide mechanism including a winding guide carriage mounted for oscillation in front of the spool of the reel, a cap for the carriage mounted for at least partial rotation on the carriage about an axis at right angles to the path of oscillation, and a winding guide mounted on the carriage cap, said guide being formed of an elongated member secured at its ends to said cap and forming therewith a closed loop, the ends of the member extending upwardly of said cap, closely parallel and generally at right angles to the path of the fishing line as it is wound, the remaining intermediate portion including a pair of sections extending rearwardly and diverging from said upright portions in a plane, said sections being connected by an arcuate portion.

3. In a fishing reel of the level winding type, an improved winding guide mechanism including a winding guide carriage mounted for oscillation in front of the spool of the reel, a cap for the carriage mounted for at least partial rotation on the carriage about an axis at right angles to the path of oscillation, a winding guide including parallel upright portions extending upwardly from the carriage cap, substantially at right angles to the path of the line, and an enlarged portion including arms extending rearwardly from the upright portions in a horizontal plane with respect to the upright portions, said arms diverging and connected together at their outer ends to form a quadrant of a circle, and a support for the arcuate portion of the quadrant mounted on portions of the reel structure.

4. In a fishing reel of the level winding type, an improved winding guide mechanism including a winding guide carriage mounted for oscillation in front of the spool of the reel, a cap for the carriage mounted for at least partial rotation on the carriage about an axis at right angles to the path of oscillation, a winding guide including parallel upright portions extending upwardly from the carriage cap, substantially at right angles to the path of the line, and an enlarged portion including arms extending rearwardly from the upright portions in a horizontal plane with respect to the upright portions, said arms diverging and connected together at their outer ends to form a quadrant of a circle, and means for supporting the arcuate portion of the quadrant including a channel member for receiving the arc to permit the arc to rockably oscillate therein while restricting vertical movement thereof and means for connecting the channel to the reel structure.

5. The combination of claim 4 wherein means are provided for holding the arc in its channel comprising a spring extending from one end of the channel to the centerpoint of the arc.

References Cited in the file of this patent

UNITED STATES PATENTS

| 1,484,906 | Russell | Mar. 6, 1923 |
| 2,652,212 | Holahan | Jan. 28, 1952 |

FOREIGN PATENTS

| 132,045 | Sweden | June 19, 1951 |